United States Patent
Oakley

(10) Patent No.: US 8,471,503 B2
(45) Date of Patent: Jun. 25, 2013

(54) VEHICLE DOOR POWER ASSIST

(75) Inventor: Michael Oakley, Jerome Township, OH (US)

(73) Assignee: Honda Motor Co., Ltd., Tokyo (JP)

( * ) Notice: Subject to any disclaimer, the term of this patent is extended or adjusted under 35 U.S.C. 154(b) by 493 days.

(21) Appl. No.: 12/833,231

(22) Filed: Jul. 9, 2010

(65) Prior Publication Data
US 2012/0005965 A1  Jan. 12, 2012

(51) Int. Cl.
*H02P 1/00* (2006.01)

(52) U.S. Cl.
USPC .......................... 318/280; 318/266; 318/282

(58) Field of Classification Search
USPC ................. 318/280, 266, 282, 376, 484, 259, 318/287; 180/271
See application file for complete search history.

(56) References Cited

U.S. PATENT DOCUMENTS

| | | |
|---|---|---|
| 5,396,158 A | 3/1995 | Long et al. |
| 6,877,280 B2 | 4/2005 | Yokomori |
| 6,925,942 B2 | 8/2005 | Yokomori |
| 7,210,731 B2 * | 5/2007 | Ichinose et al. ............... 296/155 |
| 2007/0132273 A1 | 6/2007 | Suzuki et al. |

* cited by examiner

*Primary Examiner* — Karen Masih
(74) *Attorney, Agent, or Firm* — Rankin, Hill & Clark LLP

(57) ABSTRACT

Vehicles equipped with sliding doors that undergo powered openings typically are prohibited from opening if the vehicle is in drive. Various modes of door operation are disclosed that safely enable powered operation of a vehicle sliding door regardless of the transmission state of the vehicle.

33 Claims, 11 Drawing Sheets

VEHICLE DOOR POWER ASSIST

BACKGROUND OF THE INVENTION

The presently disclosed embodiments are directed to the field of vehicles such as passenger vans and mini-vans having power operated or power assist sliding doors, and particularly to control systems and methods of operating such sliding doors.

As far as is known, currently available passenger vans and mini-vans equipped with a power operated or power assist sliding door, do not permit the power slide door to open unless the vehicle is placed in "park" or "neutral." And so, for instances in which a driver wishes to drive alongside a store entrance for example, and let a passenger in the rear exit the vehicle through the power slide door, the driver must drive the vehicle to the intended location and then put the vehicle in park or neutral in order for the sliding door to then be opened and allow the passenger to exit. As will be appreciated, requiring the vehicle to be in park or neutral is a result of safety concerns. Although such current door configurations are satisfactory in many regards, it would be desirable to enable a power slide door to be safely opened without putting the vehicle in park or neutral, so that the vehicle could be left in "drive" for example.

In addition, for such scenarios in which a driver wishes to let a passenger in the vehicle rear to exit, it is typically desired to enable the passenger to quickly open the door. However, in current vehicle door operations, in order to initiate a powered opening of the door, either the driver or the passenger must locate the associated switch or actuator, which may not be near the door, and activate powered opening of the door. This is then followed by some time period during which the door transitions from its fully closed position until the door has opened a distance sufficient for the passenger to exit through. Again, although satisfactory in many respects, it would be desirable to provide a sliding door configuration in which a powered operation of the door could be readily initiated, and which enabled the door to be rapidly opened, particularly regardless of the transmission state of the vehicle.

The prior art describes numerous strategies for the control and operation of vehicle sliding doors. U.S. Pat. No. 5,396,158 to Long et al. is directed to a power door control system for a vehicle sliding door. The '158 patent describes a conventional control methodology in which powered operation of a sliding door is enabled only when the vehicle transmission is in park. The '158 patent also describes a mode of operation in which power movement of the sliding door can be initiated upon manually moving the door a predetermined distance. However, the '158 patent prefers that the door be configured so that the door may be manually opened a distance sufficient to allow a passenger to exit without initiating powered operation. In addition, the control scheme of the '158 patent, and particularly the manually initiated powered operation, all require that the vehicle be in park.

U.S. Pat. No. 6,877,280 describes a control method for a vehicle sliding door. The control method is said to address a problem in which the effects on door operation due to the vehicle accelerating are reduced. The '280 patent describes a powered closing of the door while the vehicle is moving. However, the '280 patent does not describe that the sliding door may be powered open while the vehicle is in a transmission state other than park.

U.S. Pat. No. 6,925,942 describes a requirement in the powered operation of vehicle sliding doors. The '942 patent is directed to a method of powered opening operation of a vehicle sliding door under conditions in which the vehicle is not necessarily in "Park" but the vehicle's brakes are engaged, and the vehicle is either stopped or moving at a speed of less than 3 km/hr. The '942 patent describes a problem that can arise if a powered opening operation is allowed under these conditions. That problem arises in situations in which a vehicle wheel locks up, yet the vehicle may still be moving. An example of such an occurrence is described as "quick braking." The '942 patent provides a solution to this problem and describes a control scheme in which a powered opening of a vehicle door is not allowed if a sensed "decelerating state" is determined to correspond to an occurrence of "quick braking."

US Patent Publication 2007/0132273 is directed to a problem involving power assist modes of door operation. The '273 publication describes that in certain instances, after an operator begins to manually open the door, sometimes power operation does not begin, such as in cold weather or if manufacturing tolerances are poor, see paragraphs [0004] and [0005]. The '273 publication also discloses that actuation of the door handle may initiate powered door opening operation, see [0007]. According to the '273 publication, upon this mode of manual to powered operation, powered operation begins after the door is manually released from its previously closed position and starts when the door speed is zero, i.e. manual movement of the door has stopped. After detection of such condition, the door motor is energized to initiate powered opening of the door. This is said to assist in opening the door in icy conditions. The '273 publication also describes that if the door does not open after initiation of powered operation, then the door motor is reversed to close the door.

The collective teachings of the prior art repeatedly instruct that powered operation of a vehicle sliding door should only occur when the vehicle is either in park or neutral. In fact, the background section of one patent (the '942 patent) suggests that such operation may even be mandated, "[i]n . . . . North America . . . door operation is prohibited except when the shift lever of the automatic transmission is positioned at the parking position." However, several disclosures, such as in the '280 patent, describe powered door closing operations while the vehicle is moving. And as noted, a disclosure (in the '942 patent) suggests a mode of powered opening of a vehicle door when the vehicle is not in park so long as the brakes are engaged and the vehicle speed is less than 3 km/hr.

Although satisfactory in numerous respects, the prior art does not provide a vehicle sliding door configuration in which the door may be safely opened while the vehicle is stopped and in a transmission state other than park or neutral. Accordingly, it would be desirable to provide a control system and method of operation in which a vehicle powered sliding door could be safely opened while a vehicle is stopped, regardless of the transmission state of the vehicle.

In addition, although satisfactory in many regards, the prior art does not provide a configuration for a vehicle sliding door in which a powered operation can be easily initiated and which enables a rear passenger to quickly exit the vehicle through the door opening. Thus, a need exists for a control system and method of operation for a vehicle sliding door providing this, and particularly without regard to the transmission state of the vehicle.

SUMMARY OF THE INVENTION

The difficulties and drawbacks associated with previous type systems are overcome in the present methods for various configurations in which a vehicle sliding door may be safely opened without regard to the transmission state of the vehicle. The present methods also provide door configurations in which a powered opening operation may be readily initiated and which facilitates a rear passenger to quickly exit the vehicle.

The present invention provides in one aspect, a method for initiating a powered opening operation of a vehicle sliding door. The method comprises engaging the vehicle brakes. The method also comprises confirming the speed of the vehicle is zero. The method additionally comprises actuating a door handles associated with the vehicle sliding door. And, the method also comprises manually opening the vehicle sliding door a distance of at least 50 mm, whereby a powered opening operation of the vehicle sliding door is initiated.

The present invention also provides in another aspect, a method of initiating a powered opening of a sliding door in a vehicle equipped with an automatic transmission while the transmission is in a drive state. The method comprises confirming that the vehicle brakes are engaged and that the vehicle is stopped. The method also comprises manually opening the sliding door a distance of at least 50 mm, whereby a powered operation of the vehicle sliding door is initiated.

The present invention additionally provides, in yet another aspect, a method of initiating a powered opening of a sliding vehicle door in a vehicle having an automatic transmission when the transmission is in a drive state. The method comprises engaging the vehicle brakes. The method also comprises confirming that the vehicle speed is zero. The method further comprises manually actuating an inner door handle. And, the method comprises manually opening the vehicle door at least a distance greater than 100 mm, whereby a powered opening of the vehicle door is initiated.

The invention also provides, in still another aspect, a method for initiating a powered operation of a vehicle sliding door. The method comprises engaging the vehicle brakes and confirming the speed of the vehicle is zero. The method also comprises actuating a door handle associated with the vehicle sliding door whereby powered opening of the door occurs for a first distance less than a door fully opened distance. And, the method further comprises actuating the door handle again whereby powered opening of the door occurs to thereby fully open the door.

The present invention also provides, in still another aspect, a method for initiating a powered operation of a vehicle sliding door. The method comprises engaging the vehicle brakes and confirming the speed of the vehicle is zero. The method also comprises actuating a door handle associated with the vehicle sliding door whereby powered opening of the door occurs to thereby fully open the door.

And, in still another aspect, the present invention provides a method for initiating a powered operation of a vehicle sliding door. The method comprises confirming that the vehicle transmission is in any mode besides park. The method also comprises confirming that the speed of the vehicle is zero. The method also comprises confirming at least one of conditions (i), (ii), and (iii), wherein condition (i) is that the vehicle engine alternator is not generating, (ii) is that the vehicle engine is not running, and (iii) is that a key is in the vehicle ignition and that the ignition state is in an accessory mode. And, the method further comprises initiating powered door opening, whereby the vehicle door is opened.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

In accordance with a preferred embodiment according to the present invention, a system is provided whereby a power slide door, which may also be referred to as a powered sliding door or power assist door, may be safely opened when the vehicle is not in "park" or "neutral." Instead, the door can be powered opened when the vehicle is in "drive" or any other forward gear such as "1" or "2" or reverse gear, so long as the brake is depressed and the vehicle speed is zero. In accordance with the preferred embodiment, a powered opening of the door can be initiated by a passenger unlatching the door with an interior door handle. After unlatching the door, the passenger continues to demonstrate his or her intent to exit the vehicle by manually opening the sliding door to a predetermined distance, such as approximately 100 mm. After the door has passed that distance, powered operation of the door is initiated to open the door the remainder of the distance to full open.

Therefore, in a vehicle equipped with such a system, a driver may simply drive alongside a store entrance for example, stop the vehicle by braking, and then safely let a passenger exit through the power sliding door, while conveniently keeping the vehicle in "drive." The passenger can readily exit the vehicle by simply unlatching or otherwise grasping the inner door handle and manually partially opening the door. Powered operation of the door begins after the door has been manually opened by some minimum distance.

Figure 1:
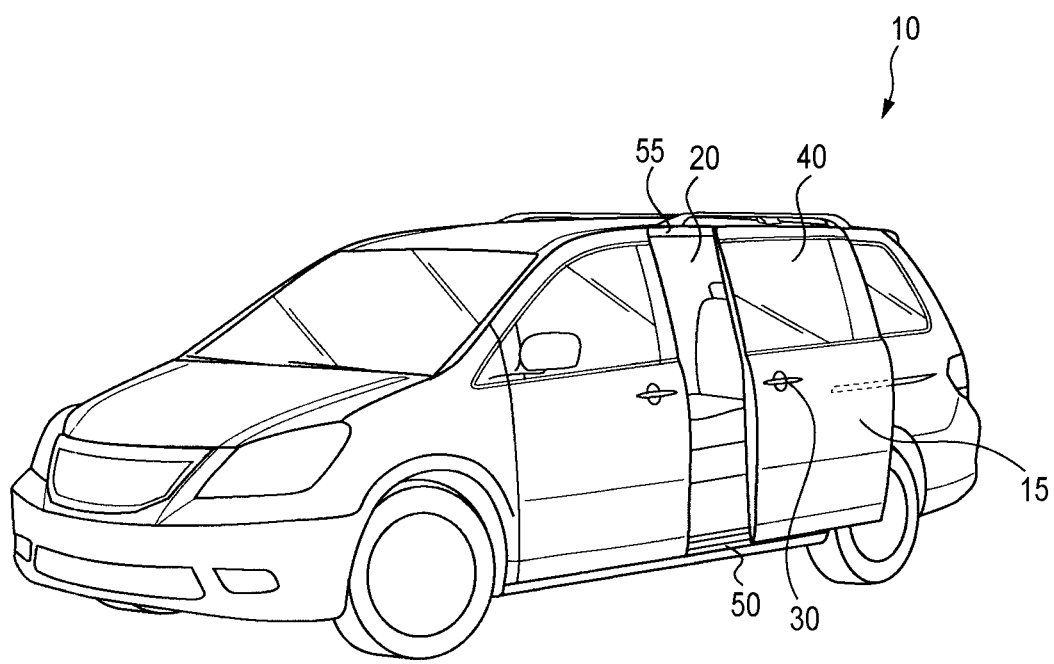
FIG. 1 illustrates a typical vehicle having a sliding side door, to which the present invention is directed.

FIG. 1 illustrates a typical vehicle 10 equipped with a slidable side door 15. The door 15 is movably positionable across a door opening 20 defined in the vehicle 10. As will be appreciated, the door 15 can be selectively opened and closed so as to allow access to the interior of the vehicle 10. Generally, such doors as door 15, are powered by a drive assembly (not shown) that provides for a powered opening operation and a powered closing operation. Typically, such doors 15 include an outer door handle 30, an inner door handle (not shown) and a window 40. One or more tracks or door receiving regions are provided in the vehicle 10, such as a lower track 50 and an upper track 55, that engage and guide movement of the door 15 between its closed and fully opened positions. Typically, the door 15 is opened by moving the door toward the rear of the vehicle. Further details of typical door constructions, door accessories, drive assemblies, and operating methods are included in the patents or published patent applications referenced herein.

Figure 2:
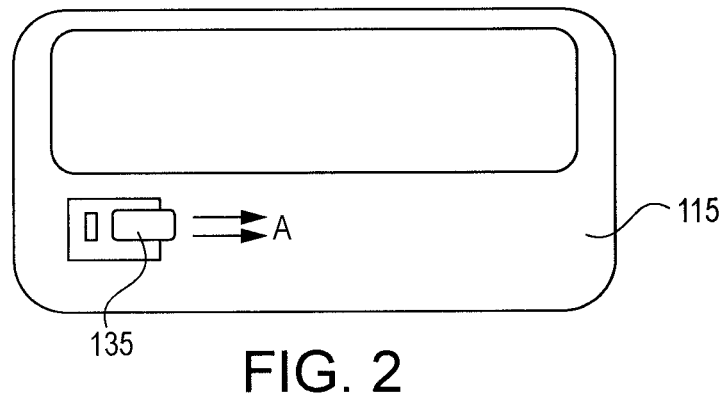
FIG. 2 is a schematic illustration of an inner face of a vehicle sliding door.
Figure 3:
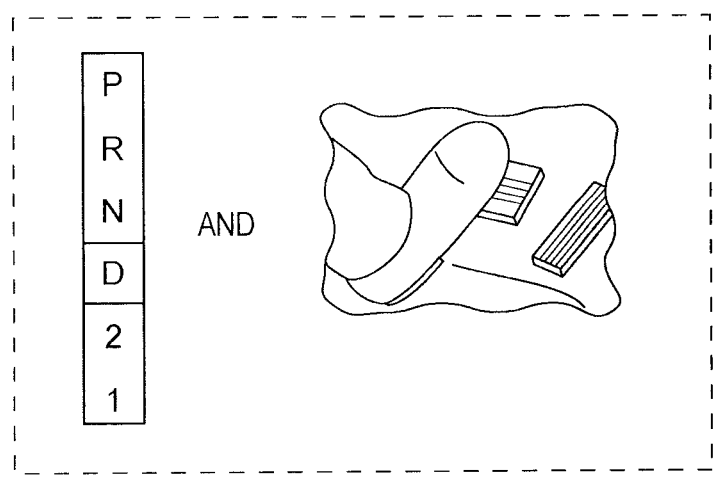
FIG. 3 depicts a particular combination of vehicle states that typically occurs when it is desired to enable a passenger to exit the vehicle through a sliding door, however which according to conventional door configurations, prevent the door from opening.

FIGS. 2 and 3 illustrate a typical problem associated with many known vehicle sliding door configurations when a vehicle is in a drive state, e.g. the vehicle transmission is either in drive, 1 or 2. As will be appreciated, vehicles equipped with an automatic transmission provide a gear selector and corresponding indicator, typically in a console alongside the driver. The transmission state is selected by the driver by positioning a lever or other actuator in one of several positions typically designated as P (park), R (reverse), N (neutral), D (drive), 2 (second gear or "second"), and 1 (first gear or "first"). The term "drive state" as used herein refers to the transmission being in any position other than park or neutral. Specifically, FIG. 2 is a schematic representation of the inner face of a vehicle sliding door 115. In the event that a passenger in the vehicle (while still in a drive state) wishes to exit the vehicle via the sliding door, the passenger grasps an inner handle 135 and pulls the door in the direction of arrows A. This attempt to open the door results in most door interlock systems to lock the door in place and thereby prevent opening of the door. That is, even if the driver engages the vehicle brake while the vehicle is in a drive state, such as depicted in FIG. 3, the door 115 will still not open. FIG. 3 illustrates this particular combination of vehicle states that typically occur in instances when it is desired to enable a passenger to exit the vehicle through a sliding door. Even when depressing the vehicle brakes, the door 115 will not open because the transmission is in a drive state, e.g. D.

Figure 4:
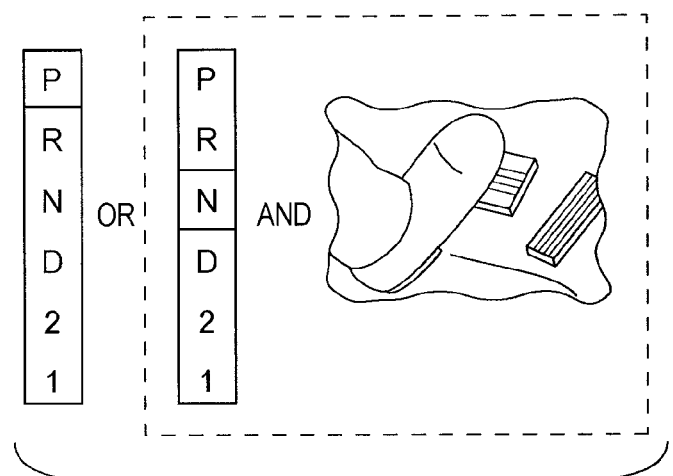
FIG. 4 depicts two combinations of vehicle states, either of which must typically occur for conventional door configurations, in order to initiate a powered opening of a vehicle sliding door and thereby enable a passenger to exit the vehicle through the resulting door opening.
Figure 5:
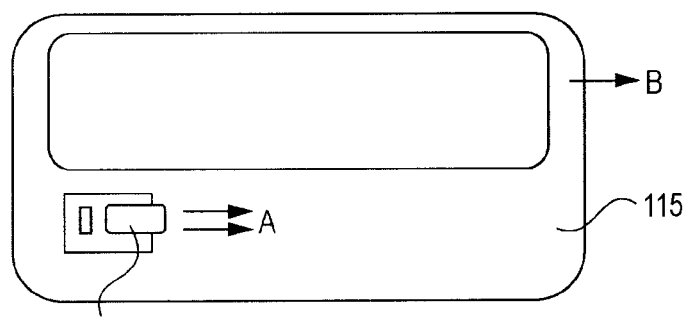
FIG. 5 is a schematic illustration of the vehicle sliding door of FIG. 2, after release of one or more interlocks.
Figure 6:
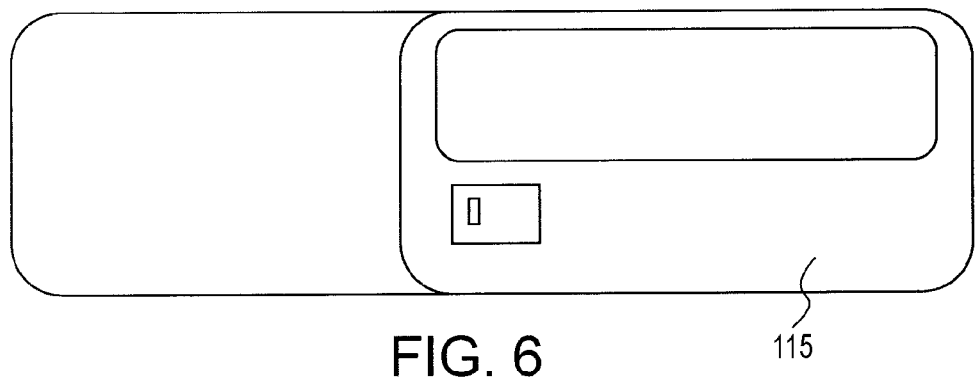
FIG. 6 is a schematic illustration of the vehicle sliding door of FIG. 5, after fully opening the door.

In many known vehicle sliding door configurations, in order to open the door, or more specifically, for powered operation of the door to occur, the driver must place the vehicle in park, or in neutral and engage the brakes. This is shown in FIG. 4. That is, FIG. 4 depicts a particular combination of vehicle states that typically must occur for conventional door systems, in order to initiate a powered door opening and thereby enable a passenger to exit the vehicle. Upon confirmation of either of these states, powered door opening operation may occur as shown in FIGS. 5 and 6. FIG. 5 illustrates movement of the inner handle 135 in the direction of arrows A, which may initiate powered opening of the door 115 in the direction of arrow B when the vehicle is in either of the states shown in FIG. 4. FIG. 6 illustrates the door 115 in a fully opened position.

Figure 7:
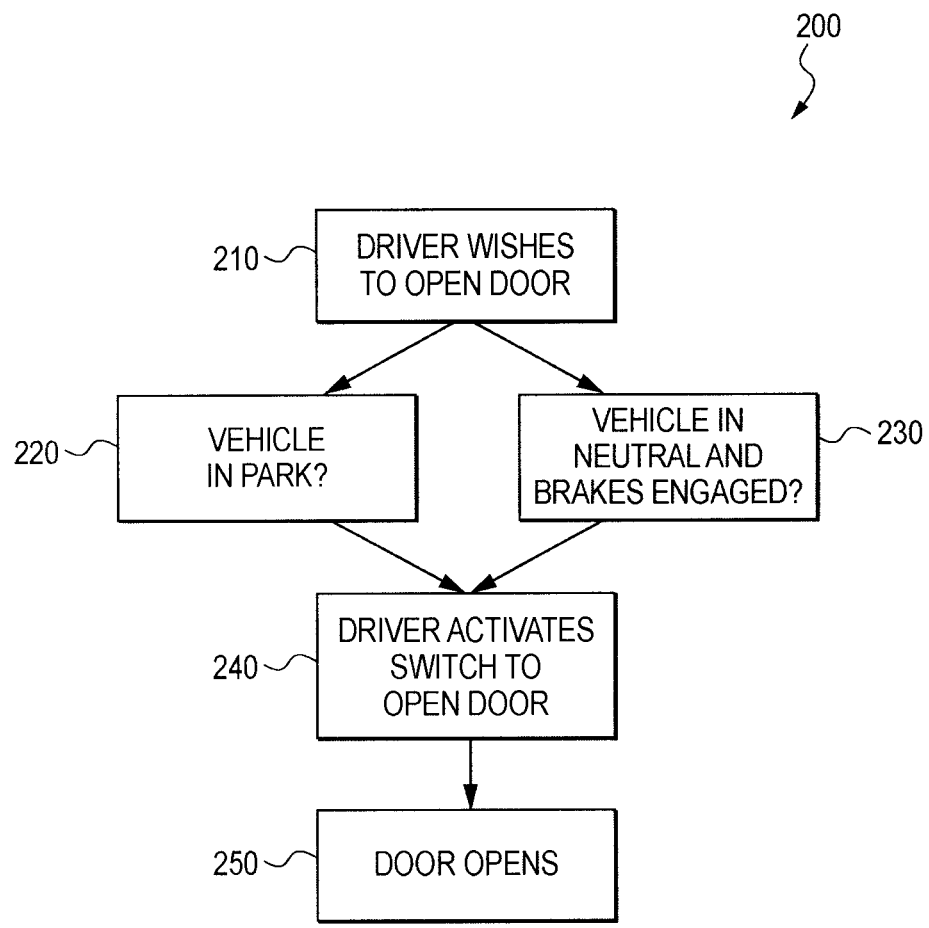
FIG. 7 is a flowchart illustrating a conventional powered door opening configuration.

FIG. 7 represents this door opening configuration used in many known vehicle sliding door configurations, designated as 200 and as generally described and shown in FIGS. 2-6. In FIG. 7, block 210 represents an initial state 210 prior to the door being opened, in which the driver (or any other individual such as a passenger or person outside of the vehicle) wishes to open the door. Either of blocks 220 and 230 must be confirmed. That is, the transmission of the vehicle must be in park, or the transmission must be in neutral along with the brakes being engaged. Upon confirmation of either of these states, the powered activation switch for the door must be activated. Typically, this switch is located at or near the dash region accessible to the driver. This is represented as block 240. Activation of the switch and confirmation of one of the noted transmission states, enables the door drive assembly to open the door, such as represented in block 250.

Figure 8:
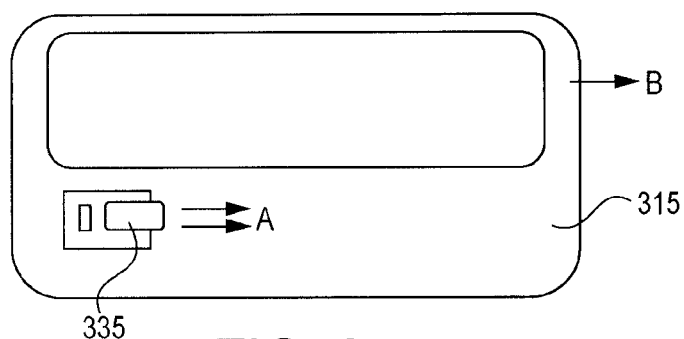
FIG. 8 is a schematic illustration of a vehicle door using a preferred door configuration in accordance with the present invention.
Figure 9:
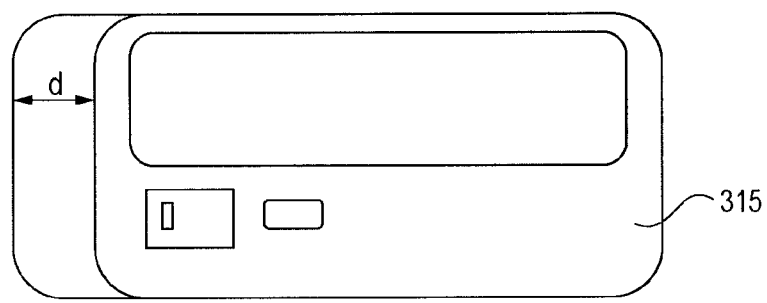
FIG. 9 illustrates the position of the door of FIG. 8 after initiating a manual movement of the door a minimum threshold distance D, in accordance with a preferred embodiment of the present invention.
Figure 10:
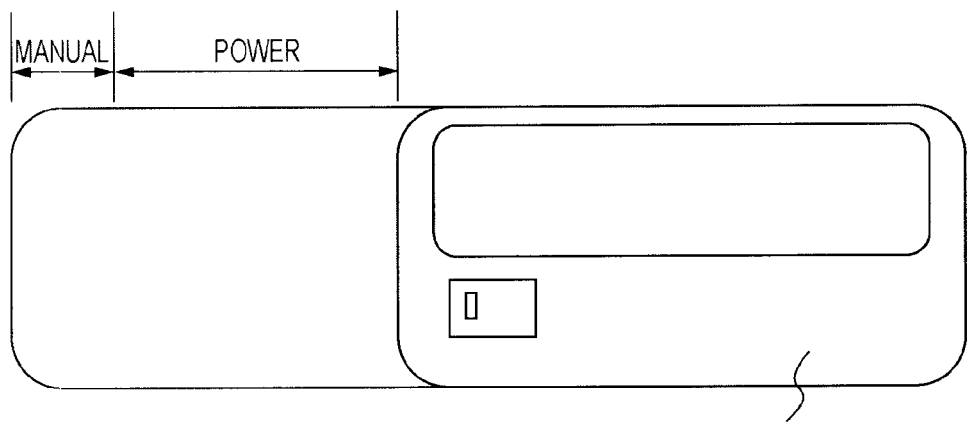
FIG. 10 illustrates the door of FIG. 8 in a fully opened position.

In accordance with a preferred embodiment of the present invention, a door configuration is provided that enables powered operation of a vehicle sliding door, without regard to the transmission state of the vehicle, and so, enables powered operation of the door even when the transmission is in drive, or any other position besides park or neutral. FIG. 8 illustrates an inner face of a vehicle sliding door 315 and an operator's hand symbolized by rectangle 335. Upon a passenger grasping the handle of the door with hand 335 and applying an opening force in the direction of arrows A, the door 315 begins to manually open in the direction of arrow B. After the door 315 has been manually moved some minimum distance D, as shown in FIG. 9, powered operation of the door is then automatically initiated. The door 315 continues to open until the door reaches a fully opened position, such as depicted in FIG. 10. FIG. 10 also illustrates representative portions of the door travel distance during which the door is manually operated and under powered operation in this preferred embodiment.

Figure 11:
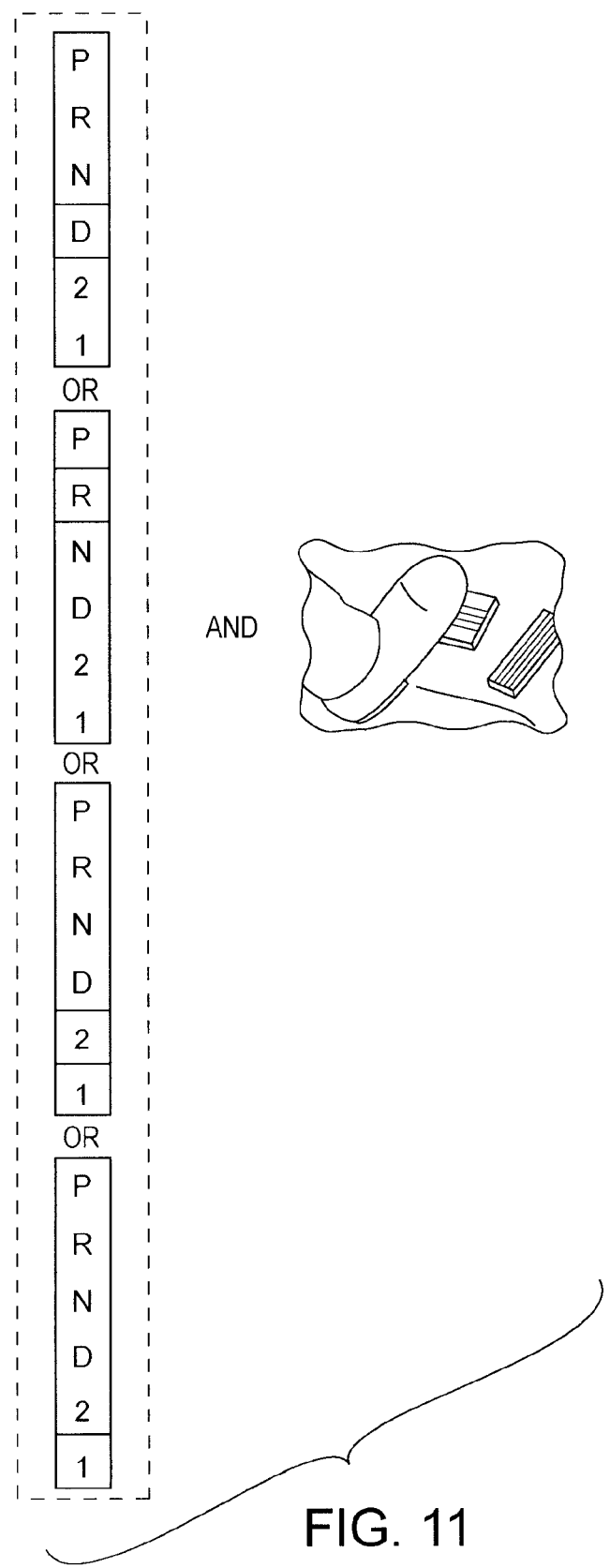
FIG. 11 illustrates exemplary vehicle states in which powered operation of a vehicle sliding door is enabled in accordance with a preferred embodiment of the present invention.

FIG. 11 illustrates the various transmission states that the vehicle may be in while performing any or all of the operations shown in FIGS. 8-10. That is, so long as the vehicle brakes are engaged, and the transmission is either in drive, reverse, 1, or 2; powered door operation may occur. In addition to the transmission states shown in FIG. 11, it is also contemplated that the vehicle may be in any transmission state, even besides the states shown in FIG. 11. For example, for transmissions having a greater number of gears, the previously described door configuration of FIGS. 8-10 may occur while a transmission is in 3 or 4, or one of several reverse gears. Furthermore, it is to also be appreciated that the door configuration depicted in FIGS. 8-10 may also occur while the transmission is in park or neutral. In the event that the transmission is in neutral, it would be desirable to still require that the vehicle brakes are engaged. For situations in which the vehicle transmission is in park, it would not be necessary to require that the vehicle brakes were engaged.

Figure 12:
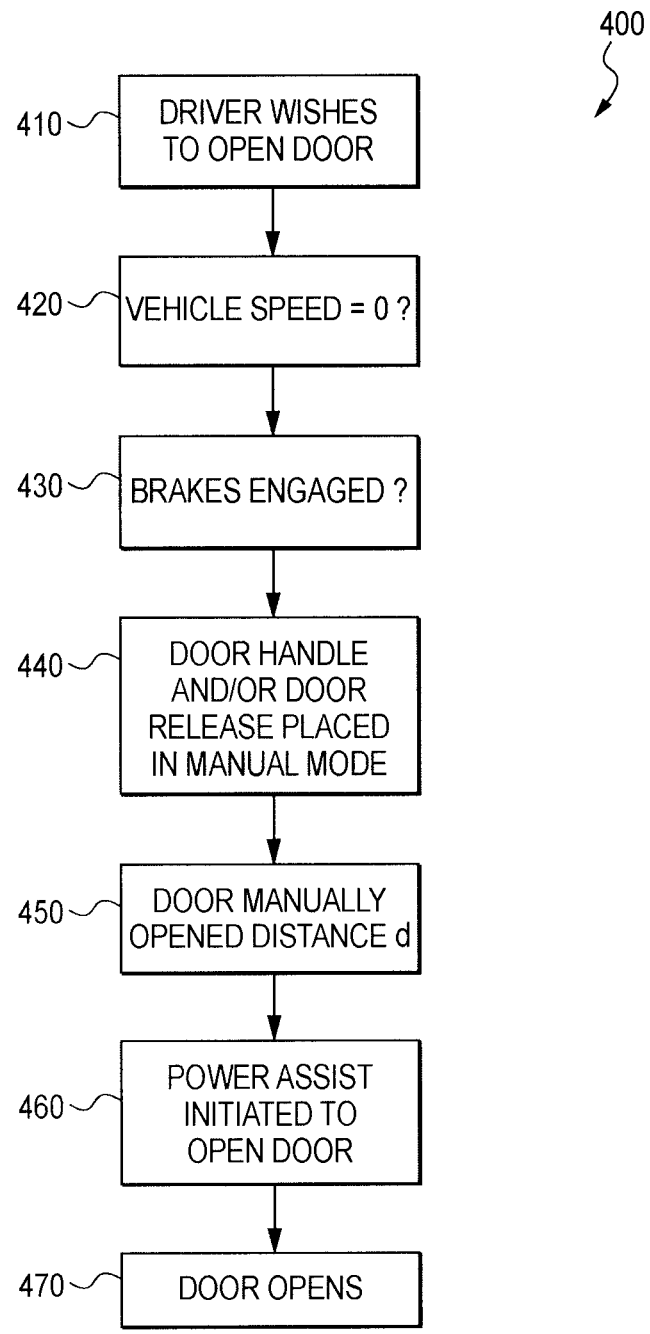
FIG. 12 is a flowchart illustrating a preferred embodiment door configuration in accordance with the present invention.

A preferred door configuration is represented by FIG. 12. That is, a preferred door configuration 400 is shown which is initiated by a request or wish to open the door, such as in block 410. A check that the vehicle speed is zero, and that the brakes are engaged are shown as blocks 420 and 430, respectively. Actuation of the door handle or door release, such as by a vehicle passenger, places the door operation in a manual mode. This is represented as block 440. Upon the door being opened some minimum threshold distance D, as shown by block 450, a powered opening operation of the door is initiated. Preferably, the powered opening operation is automatically initiated upon the door being opened a threshold distance D. This is shown as block 460. The door may then fully open as shown in block 470.

Referring to the preferred embodiment method depicted in FIG. 12, block 420 represents an operation in which confirmation is made that the speed of the vehicle is zero or restated, that the vehicle is not moving. As will be appreciated, confirmation of such a state can be achieved in a variety of fashions. For example, one or more speed sensors can be provided on the vehicle drive train, and/or on one or more of the vehicle's wheels. Signals or information may be obtained directly from the speedometer and related systems of the vehicle. Preferably, confirmation that the vehicle speed is zero is achieved by checking whether the speed signal is zero and maintained as zero for some minimum time period, such as for example at least 500 milliseconds. For example, if a signal indicating that speed is zero is only maintained for 400 milliseconds, the condition of block 420 is not satisfied. If however, a zero speed signal is registered for a continuous time period of 600 milliseconds, the condition of block 420 is satisfied.

In performing the preferred embodiment method depicted in FIG. 12, it is preferred to also confirm that the vehicle brakes have been engaged. That is, in addition to engaging the vehicle brakes (block 430), such as by the driver depressing the brake pedal, one or more sensors could be used to confirm that the vehicle brakes were in fact engaged. Such sensors could be utilized at various points within the vehicle braking system and/or be used at one or more brake assemblies proximate the vehicle wheels. It is recognized that engaging the vehicle brakes (block 430) will result or eventually result, in the speed of the vehicle being zero (block 420). However, it is most preferred that block 420 serve as a separate interlock such that the next operation in the preferred embodiment method, e.g. block 440, can only occur after confirmation that the vehicle speed is zero. Thus, the preferred embodiment method of FIG. 12 requires that both of these conditions be satisfied, (i) that the brakes are engaged, and (ii) that the vehicle speed is zero.

In the event that during a door opening operation, if the brakes are released, the system can be configured to respond in a variety of fashions. For example, if the door has only opened some relatively small distance, and then the brakes are released, it may be preferable for the system to stop or discontinue the door opening operation. It is also contemplated to configure the system so that in this situation, the door reverses, and begins a closing operation. However, if the door has opened beyond some minimum distance, it may in certain applications be preferred to stop the door at that point, and to not reverse operation to close the door. In all instances, it would likely be desirable to actuate a warning indicator to the driver of such condition.

In the event that a door opening operation has occurred, such as via the process depicted in FIG. 12, and then after the door has reached its fully open position, the driver releases the brakes; the system may be configured in a variety of ways. In such an instance, upon release of the vehicle brakes, the door may be configured to close. Or, the door may simply be permitted to remain in this open state. Again, it is contemplated that one or more warning indicators would be actuated to indicate the occurrence of such a situation.

The preferred embodiment method also includes an operation of actuating a door handle of the sliding door to be opened (block 440). Generally, this operation places the sliding door control system in a manual mode, so that the door does not automatically open at this particular time. Typically, the door handle to be actuated is an inner door handle. However, the present invention is not limited to such, and it is contemplated that an outer door handle could also be actuated. Actuation can be accomplished in a variety of ways. Preferably, grasping or pulling the handle serves to actuate the door and place the door in a manual mode.

Once the door is placed in a manual mode (block 440), the door is then manually opened to at least some minimum distance shown in FIG. 9 and FIG. 12 as "d." Preferably, this distance D is at least 50 mm. In other embodiments, it may be preferred that this distance D is at least 100 mm. In still other embodiments, it may be preferred that this distance D is at least 500 mm. Preferably, for the embodiment described herein, it is preferred that the distance D is about 100 mm.

After the door has been manually opened to or beyond the distance D, powered opening of the door is initiated. As will be appreciated, one or more sensors can be used to determine the position of the door relative to its fully closed position to determine whether the door has been manually opened to or beyond distance D. Examples of such sensors may include proximity or limit switches incorporated on the door or in one or more tracks that guide and direct movement of the door. It is also contemplated that one or more of such sensors may be incorporated in the door power opening and closing drive system.

The preferred embodiment methods described herein are adapted for use in vehicles having automatic transmissions. As explained herein, a significant feature of the present invention is that the method can be performed regardless of the state of the transmission. That is, the method can be performed when the transmission is in any state, such as drive. It is not necessary that the transmission be in park or neutral.

The present invention can be utilized in a vehicle having multiple sliding doors. Furthermore, it is also contemplated that the present invention could be employed in a vehicle equipped with a manual transmission having a clutch pedal, as opposed to an automatic transmission.

Figure 13:
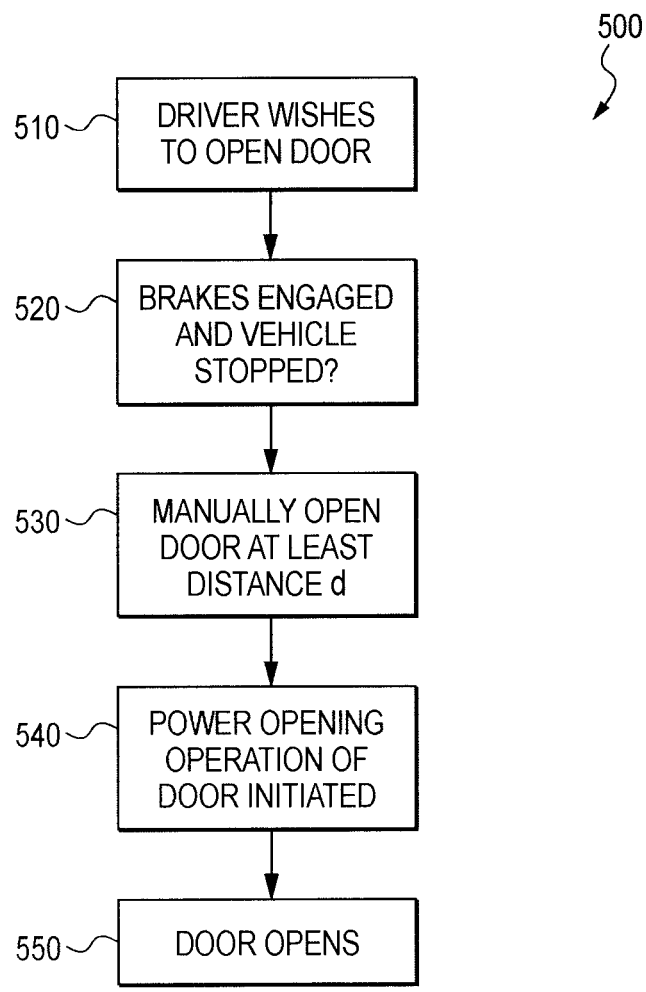
FIG. 13 is a flowchart illustrating another preferred embodiment door configuration in accordance with the present invention.

FIG. 13 illustrates another preferred door configuration 500 in accordance with the present invention. In this preferred method, a powered opening of a vehicle sliding door can be initiated while the transmission is in a drive state. This method begins upon a driver or other individual intending to open the sliding door, which is represented by block 510. The vehicle brakes must be engaged and the vehicle must be stopped. This is shown as block 520. These conditions are established by confirming that the brakes are engaged and that the vehicle is stopped, such as by use of sensors as previously described in regards to FIG. 12. As previously explained with regard to FIG. 12, it is preferred that confirmation that the vehicle has stopped is achieved by confirming that zero vehicle speed is maintained for some minimum time period, such as for example, at least 500 milliseconds. The method 500 then involves manually opening the vehicle sliding door (block 530), which typically is performed by a passenger in the rear of the vehicle wishing to exit through the door opening. As previously explained, the door is manually opened to at least some minimum distance D, which is preferably at least 50 mm. Upon sensing or other indication that the door has been manually moved this distance D, powered operation of the door is initiated (block 540). The door then opens (block 550) and may continue to open to its fully open position or any position between d and the fully open position.

Figure 14:
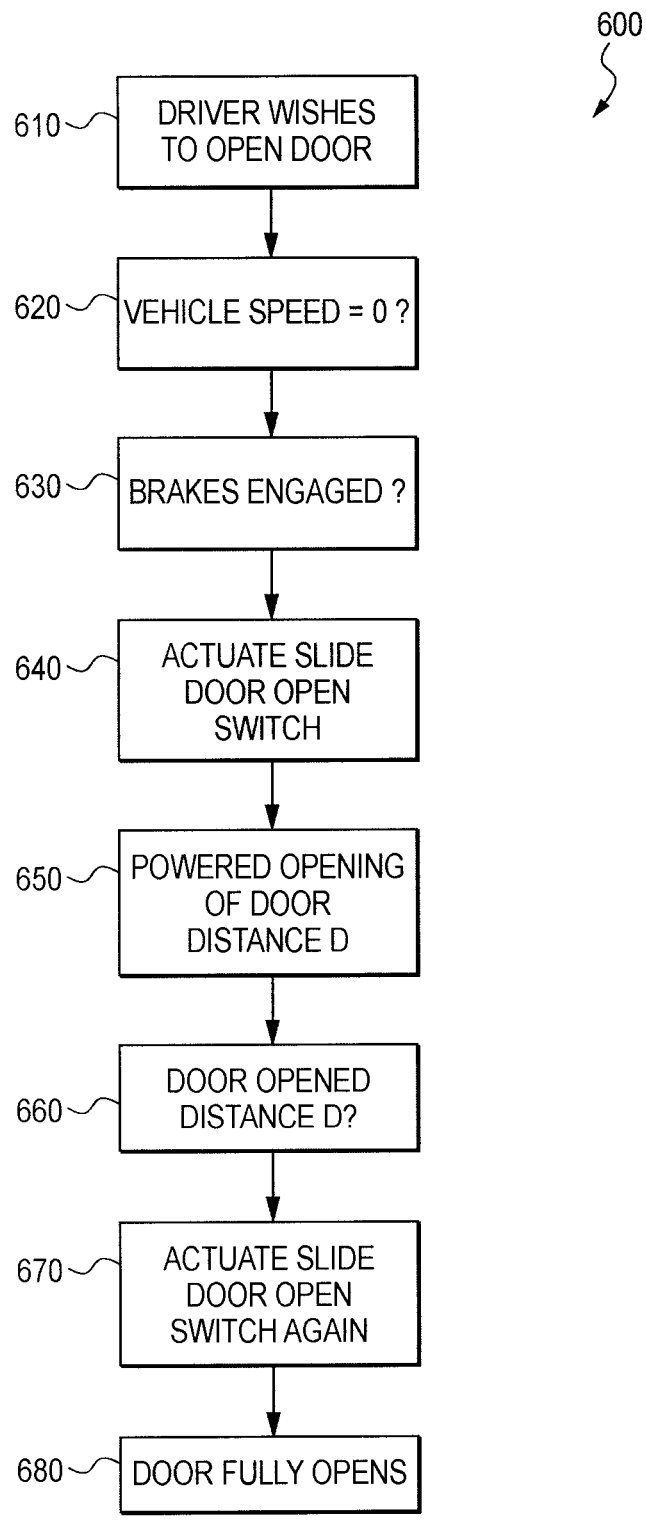
FIG. 14 is a flowchart illustrating another preferred embodiment door configuration in accordance with the present invention.

In another preferred door configuration 600 illustrated in FIG. 14, a powered opening of a vehicle sliding door can be initiated while the transmission is in drive state. This method begins upon a driver or other individual intending to open the sliding door, which is indicated as block 610. The vehicle speed must be zero. As previously explained, most preferably, this condition is achieved by a speed signal continuously being registered as zero for some minimum time period such as for example at least 500 milliseconds. This is shown as block 620. The method also requires that the vehicle's brakes be engaged, as represented by block 630. The method is further advanced by an operator actuating a door open switch, shown as block 640. A powered opening of the sliding door is then performed for some minimum distance, such as for example a distance D, which could for example be 50 mm. This is shown as block 650. This initial door opening distance is less than the distance which the door travels to a door fully opened position. Upon sensing or other confirmation that the door has traveled distance D, as noted by block 660, the method if then further advanced by the operator actuating the door open switch a second time, as represented by block 670. The door then fully opens as represented by block 680.

Figure 15:
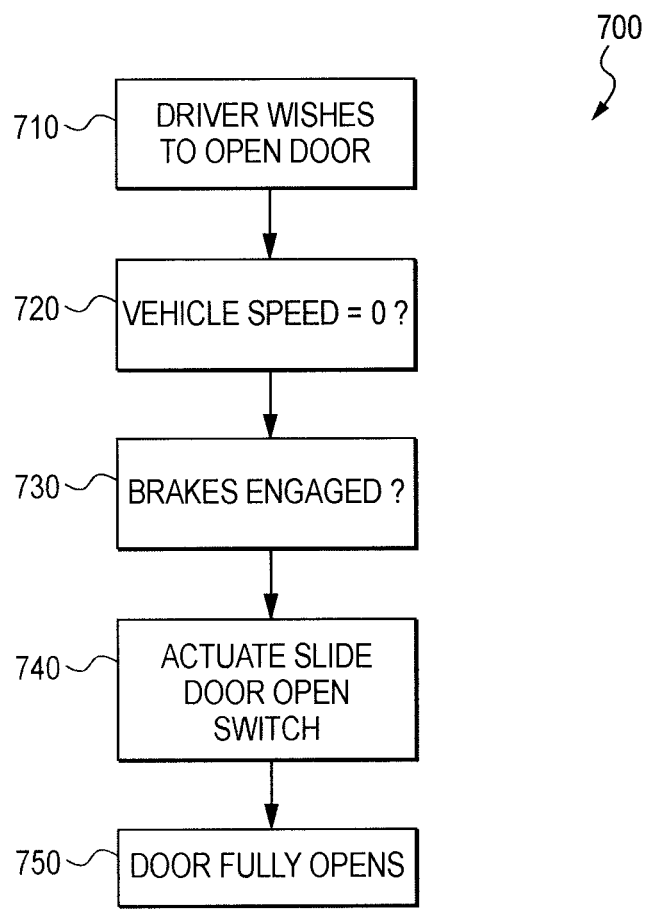
FIG. 15 is a flowchart illustrating another preferred embodiment door configuration in accordance with the present invention.

In still another preferred door configuration 700 presented in FIG. 15, a powered door opening operation can be initiated while the vehicle transmission is in a drive state. This method begins by a driver or other operator intending to open the door, shown as block 710. The vehicle speed must be zero as represented by block 720. As previously explained, it is most preferred that this operation is performed by monitoring a vehicle speed signal and confirming that the speed signal is zero and continuously maintained as zero for some minimum time period, such as at least 500 milliseconds. The method also requires that the vehicle brakes be engaged, represented as block 730. The method 700 is further advanced by a slide door open switch being actuated, as shown in block 740. The door is then powered fully open, as shown by block 750.

Figure 16:
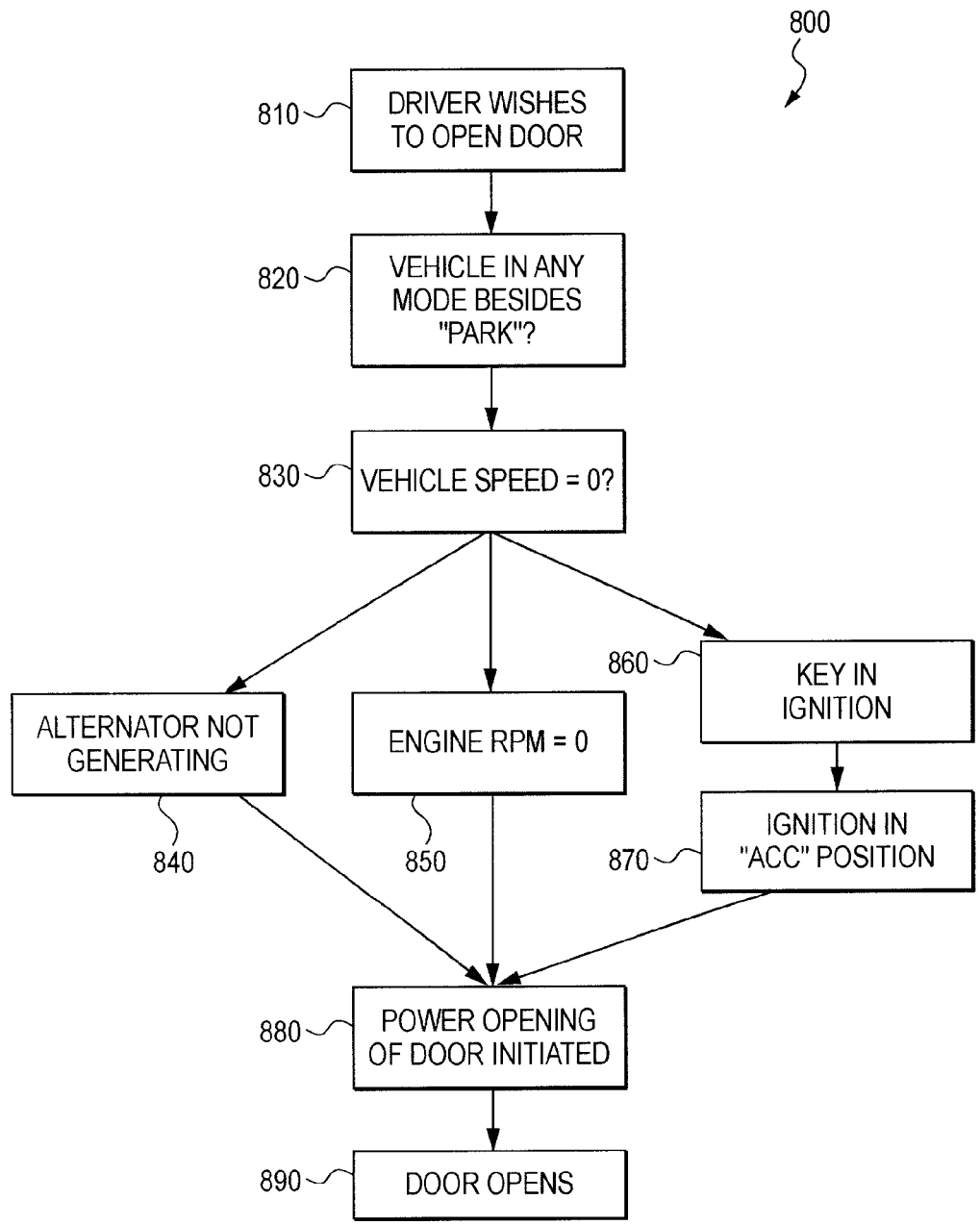
FIG. 16 is a flowchart illustrating another preferred embodiment door configuration in accordance with the present invention.

FIG. 16 illustrates yet another preferred door configuration 800 in accordance with the invention. In this method, a driver intends or wishes to open a vehicle door, represented by block 810. The method is advanced by confirming that the vehicle is in any other mode besides "park," as shown by block 820. Confirmation is made that vehicle speed is zero, as shown by block 830. As previously explained, it is most preferred that confirmation be made that the vehicle speed is zero for at least some minimum time period, such as for example, at least 500 milliseconds. Next, one or more of the following conditions must exist in order for a powered door opening operation to occur; (i) the engine alternator must not be generating any electrical current, thereby indicating the engine is not running, shown by block 840, (ii) the engine RPM signal must be zero, thereby indicating that the engine is not running, and/or (iii) the key must be in the vehicle ignition switch, shown as block 860, and the ignition switch must be in an "Accessory" or "ACC" position, shown as block 870. In the event that at least one of (i), (ii), and (iii) is established, the method can advance so that a power opening of the door is initiated as shown by block 880. The door then opens as denoted by block 890. The previously described door configuration 800 is particularly well suited for accommodating attempts and efforts to open a vehicle sliding door in carwash scenarios, such as when the vehicle is on a conveyor and the transmission is in "Neutral" or a drive state, the vehicle is unoccupied yet the door needs to be opened in order to wipe the door sill or access the interior of the vehicle.

Many other benefits will no doubt become apparent from future application and development of this technology.

All patents and published patent applications referenced herein, are incorporated by reference in their entirety.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A method for initiating a powered opening operation of a vehicle sliding door, the method comprising:
   engaging the vehicle brakes;
   confirming the speed of the vehicle is zero;
   actuating a door handle associated with the vehicle sliding door; and
   manually opening the vehicle sliding door a distance of at least 50 mm, whereby a powered opening operation of the vehicle sliding door is initiated.

2. The method of claim 1 further comprising:
   confirming that the vehicle brakes have been engaged.

3. The method of claim 1 wherein confirming the speed of the vehicle is zero is performed by confirming that a speed signal is zero and continuously maintained as zero for at least 500 milliseconds.

4. The method of claim 1 wherein the distance of manual opening of the vehicle sliding door is at least 100 mm.

5. The method of claim 1 wherein the distance of manual opening of the vehicle sliding door is at least 500 mm.

6. The method of claim 1 wherein the distance of manual opening of the vehicle sliding door is about 100 mm.

7. The method of claim 1 wherein the vehicle sliding door is in a vehicle having an automatic transmission, and the method is performed while the transmission is in a drive state.

8. The method of claim 7 wherein the transmission is in drive.

9. The method of claim 1 wherein the vehicle sliding door is in a vehicle having an automatic transmission, and the method is performed without regard to the transmission state.

10. The method of claim 1 wherein the door handle that is actuated is an inner door handle.

11. The method of claim 1 wherein the door handle that is actuated is an outer door handle.

12. A method of initiating a powered opening of a sliding door in a vehicle equipped with an automatic transmission while the transmission is in a drive state, the method comprising:
   confirming that the vehicle brakes are engaged and that the vehicle is stopped; and
   manually opening the sliding door a distance of at least 50 mm, whereby a powered operation of the vehicle sliding door is initiated.

13. The method of claim 12 further comprising:
   confirming that a speed of the vehicle is zero.

14. The method of claim 13 wherein confirming the speed of the vehicle is zero is performed by confirming that a speed signal is zero and continuously maintained as zero for at least 500 milliseconds.

15. The method of claim 12 wherein the distance of manual opening of the vehicle sliding door is at least 100 mm.

16. The method of claim 12 wherein the distance of manual opening of the vehicle sliding door is at least 500 mm.

17. The method of claim 12 wherein the distance of manual opening of the vehicle sliding door is about 100 mm.

18. The method of claim 12 wherein the transmission is in drive.

19. A method of initiating a powered opening of a sliding vehicle door in a vehicle having an automatic transmission when the transmission is in a drive state, the method comprising:
   engaging a vehicle brake;
   confirming that a vehicle speed is zero;
   manually actuating an inner door handle; and
   manually opening the vehicle door at least a distance greater than 100 mm;
   whereby a powered opening of the vehicle door is initiated.

20. The method of claim 19 wherein the transmission is in a state selected from the group consisting of reverse, drive, second, and first.

21. A method for initiating a powered operation of a vehicle sliding door, the method comprising:
engaging the vehicle brakes;
confirming the speed of the vehicle is zero;
actuating a door handle associated with the vehicle sliding door whereby powered opening of the door occurs for a first distance less than a door fully opened distance;
actuating the door handle again whereby powered opening of the door occurs to thereby fully open the door.

22. The method of claim 21 wherein confirming the speed of the vehicle is zero is performed by confirming that a speed signal is zero and continuously maintained as zero for at least 500 milliseconds.

23. The method of claim 21 wherein the first distance is at least 50 mm.

24. The method of claim 21 wherein the vehicle sliding door is in a vehicle having an automatic transmission, and the method is performed while the transmission is in a drive state.

25. The method of claim 24 wherein the transmission is in drive.

26. The method of claim 21 wherein the vehicle sliding door is in a vehicle having an automatic transmission, and the method is performed without regard to the transmission state.

27. A method for initiating a powered operation of a vehicle sliding door, the method comprising:
engaging the vehicle brakes;
confirming the speed of the vehicle is zero, wherein confirming the speed of the vehicle is zero is performed by confirming that a speed signal is zero and continuously maintained as zero for at least 500 milliseconds;
actuating a door handle associated with the vehicle sliding door whereby powered opening of the door occurs to thereby fully open the door.

28. The method of claim 27 wherein the vehicle sliding door is in a vehicle having an automatic transmission, and the method is performed while the transmission is in a drive state.

29. The method of claim 27 wherein the transmission is in drive.

30. The method of claim 27 wherein the vehicle sliding door is in a vehicle having an automatic transmission, and the method is performed without regard to the transmission state.

31. A method for initiating a powered operation of a vehicle sliding door, the method comprising:
confirming that the vehicle transmission is in any mode besides park;
confirming that the speed of the vehicle is zero;
confirming at least one of conditions (i), (ii), and (iii), wherein condition (i) is that the vehicle engine alternator is not generating, (ii) is that the vehicle engine is not running, and (iii) is that a key is in the vehicle ignition and that the ignition state is in an accessory mode;
initiating powered door opening, whereby the vehicle door is opened.

32. The method of claim 31 wherein the vehicle transmission is in neutral.

33. The method of claim 31 wherein confirming the speed of the vehicle is zero is performed by confirming that a speed signal is zero and continuously maintained as zero for at least 500 milliseconds.

* * * * *